Aug. 27, 1968     ZENSUKE TAMURA ET AL     3,398,509
METHOD OF AND APPARATUS FOR DESULFURIZING INDUSTRIAL WASTE GASES
Filed Aug. 15, 1967
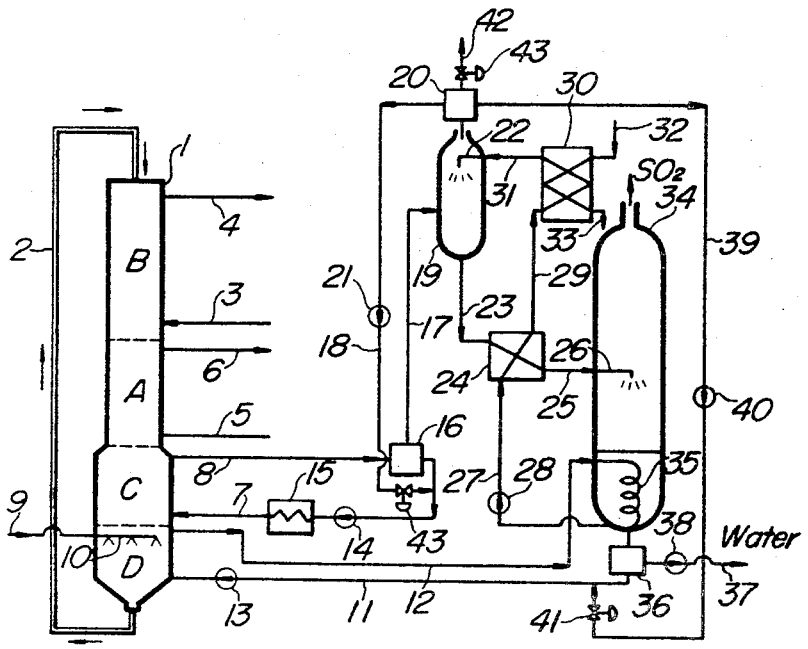
INVENTORS
ZENSUKE TAMURA
YUKIO HISHINUTTA
BY Craig & Antonelli
ATTORNEYS 3,398,509
Patented Aug. 27, 1968

3,398,509
METHOD OF AND APPARATUS FOR DESULFURIZING INDUSTRIAL WASTE GASES
Zensuke Tamura and Yukio Hishinuma, Hitachi-shi, Japan, assignors to Hitachi, Ltd., Tokyo, Japan, a corporation of Japan
Filed Aug. 15, 1967, Ser. No. 660,714
Claims priority, application Japan, Aug. 15, 1966, 41/53,605, 41/53,606; Sept. 21, 1966, 41/61,974, 41/61,979, 41/61,981
6 Claims. (Cl. 55—73)

ABSTRACT OF THE DISCLOSURE

A method of and an apparatus for desulfurizing industrial waste gases by means of moving bed system using active carbon and having a low temperature adsorption zone, a high temperature adsorption zone, a desorption zone and a cooling zone arranged from the top to the bottom thereof, characterized in that a suitable amount of cooling water is injected directly into the cooling zone to directly cool the active carbon.

BACKGROUND OF THE INVENTION

Field of the invention

The present invention relates to a method of and an apparatus for desulfurizing industrial waste gases for the purpose of removing toxic components, such as sulfurous anhydride ($SO_2$) and sulfuric anhydride ($SO_3$), from said waste gases exhausted from boilers and various types of industrial furnaces.

More particularly, the present invention relates to a method of desulfurizing industrial waste gases, which comprises the steps of removing sulfurous anhydride and sulfuric anhydride contained in the waste gases therefrom by adsorbing them with active carbon particles, regenerating the contaminated active carbon particles by subjecting them to a desorption treatment using a high temperature gas and recirculating the regenerated active carbon particles for reuse, and in which an improvement is made in cooling the active carbon patricles after said particles have been subjected to the desorption treatment, and an apparatus for practicing said method.

Description of the prior art

Conventional desulfurizing methods using active carbon are generally classified into two types in terms of the manner in which the active carbon is regenerated.

Namely, one type of the methods comprising stacking numerous active carbon particles into a tower in a columnar shape, the interior of which tower is sectioned, from the top to bottom, at low temperature adsorption zone, a high temperature adsorption zone, a high temperature desorption zone and a cooling zone; causing the bed of active carbon particles thus formed to constantly move downwardly through said zones at a suitable rate; and recirculating the active carbon particles leaving the cooling zone to the top of the low temperature adsorption zone. More specifically, according to this type of method, waste gases from a boiler or a blast furnace are, first of all, caused to pass through the high temperature adsorption zone and then through the low temperature adsorption zone, whereby sulfurous anhydride ($SO_2$) and sulfuric anhydride ($SO_3$), contained in said waste gases are adsorbed by the active carbon particles in said zones. The waste gases leaving the low temperature adsorption zone and are released into the atmosphere through a chimney. The active carbon particles having adsorbed the sulfurous anhydride and sulfuric anhydride move downwardly into the high temperature adsorption zone, in which they are subjected to a desorption treatment by a heated inert gas, such as heated nitrogen gas ($N_2$) or carbon dioxide gas ($CO_2$), at a temperature of about 400° C. The resultant gases containing concentrated sulfurous anhydride and sulfuric anhydride therein are released into the atmosphere after having been washed with water or sea water.

Now, the active carbon particles leaving the high temperature adsorption zone are cooled in the cooling zone therebeneath. The cooling is effected by a coolant indirectly through the wall of a tube in which said coolant is circulated. Upon completion of the cooling, the active carbon particles are recirculated to the low temperature adsorption zone at the top portion of the tower by means of an elevator. This type of method is known as the so-called dry active carbon regenerating method.

According to another type of method, there are used a plurality of active carbon particle beds, each operating in a cycle consisting of the steps of high temperature adsorption, low temperature adsorption, desorption by water and drying, but at a different phase from one another time-wise. Therefore, when considering the system as a whole, all of the steps mentioned above are carried out concurrently. This type of method is known as the so-called wet active carbon regenerating method.

However, the former types of methods, in which the active carbon particles are cooled indirectly through a cooling surface, has the drawback that uniform cooling of the carbon particles cannot be obtained and therefore, when the active carbon particles leaving the cooling zone are moved into the low temperature adsorption zone as they are, there is the danger of that part of the active carbon particles which have not been cooled burning in said low temperature adsorption zone, because said part of the particles, when used for low temperature adsorption, still maintain a temperature of about 400° C. Another drawback possessed by this type of method is that the cooling surface through which the active carbon particles are cooled tends to be subjected to corrosion.

The latter type of method, on the other hand, has the drawbacks that a lengthy time is required for drying the active carbon particles because the active carbon particles are washed with water to effect desorption and cooling simultaneously, and further that the water contained by the active carbon particles in excess to the amount which is optimum for the adsorption of water-soluble sulfurous anhydride and sulfuric anhydride, lowers the temperature of the waste gases, thus adversely affecting the chimney effect.

SUMMARY OF THE INVENTION

It is an object of the present invention to provide a method of and apparatus for desulfurizing industrial waste gases, which enable uniform cooling of regenerated active carbon particles to be attained and thereby enable regenerated active carbon particles to be obtained which have an excellent adsorbing power and an optimum humidity.

It is another object of the present invention to provide a method of and an apparatus for desulfurizing industrial waste gases, which may be operated with no decrease in chimney effect of the waste gases after said gases have been processed through the desulfurizing treatment.

These objects of the present invention may be achieved by cooling the active carbon particles directly by subjecting it to jets of water, after said particles have been processed through the desorption step using a heated inert gas.

These objects of the present invention may be even better achieved by forcibly extracting the aqueous vapor generated during cooling of the active carbon particles by jets of water, after said particles have been processed through the desorption step using the heated inert gas, or by forcibly extracting the same by means of an inert gas.

BRIEF DESCRIPTION OF THE DRAWING

The drawing shows a flow sheet according to which the present invention is operated.

DESCRIPTION OF THE PREFERRED EMBODIMENT

The method and apparatus of the present invention will now be described more specifically with reference to the accompanying drawing.

Referring to the drawing, a desulfurizing tower, which is generally indicated by numeral 1 and in which active carbon particles are to be stacked in a columnar shape, has the interior of the upper portion thereof sectioned into a high temperature adsorption zone A and a low temperature adsorption zone B. The interior of the lower portion of the desulfurizing tower is sectioned into a desorption zone C wherein desorbing operation is carried out by nitrogen gas or carbon dioxide gas, heated to a temperature of about 400° C., and a cooling zone D wherein the active carbon particles are cooled. The active carbon particles charged in the desulfurizing tower move slowly downwardly through the interior thereof with time, passing said respective zones from the top to bottom one after another. The active carbon particles having been cooled in the cooling zone are recirculated to the lower temperature adsorption zone by conveyor means 2. In operation, waste gases are first of all introduced into the tower 1 through an inlet tube 5 from the lower portion of the high temperature adsorption zone A which is maintained at a temperature of 200° C. The waste gases flow upwardly through said zone A while contacting the active carbon particles in said zone, whereby mainly sulfuric anhydride contained in the waste gases are adsorbed by the active carbon particles. The waste gases, having reached the top end of the adsorption zone A and having been heated to about 200° C., are led to the outside through an outlet tube 6 and, after cooled to 100° C. in a heat exchanger not shown, are again introduced into the desulfurizing tower 1 from the lower portion of the low temperature adsorption zone B through an inlet tube 3. In the low temperature adsorption zone B, the waste gases flow upwardly while contacting the active carbon particles in said zone, whereby mainly sulfurous anhydride contained in said waste gases is adsorbed, and then discharged to the outside through an outlet tube 4 to be released into the atmosphere through a chimney not shown.

On the other hand, the active carbon particles leaving the high temperature adsorption zone A enter the desorption zone C, wherein they are subjected to a desorption treatment by a heated inert gas, such as heated nitrogen gas or carbon dioxide gas, at a temperature of about 400° C. which is introduced into said zone by a pump 14 through a heat exchanger 15 and an inlet tube 7. The sulfurous anhydride and/or sulfuric anhydride thus desorbed from the active carbon particles are led, together with the inert gas, through an outlet tube 8 into a surge-tank 16 and thence through a tube 17 into a washing tower 19. In the washing tower 19, the sulfurous anhydride and/or sulfuric anhydride are washed with a shower of water which is introduced in said tower from a separation tower 34 by a pump 28 through a tube 27, a heat exchanger 24, a tube 29, a heat-exchanger 30 and a tube 31, and sprayed through a nozzle 22. The inert gas thus rinsed is led into a surge-tank 20 and recirculated into the tube 7 by a pump 21 through a tube 18.

The water to be used for washing the inert gas in the washing tower 19 is led through a tube 23, the heat exchanger 24 and a tube 25 into the separation tower 34, wherein it is sprayed through a nozzle 26 to separate the sulfurous anhydride and/or sulfuric anhydride from said inert gas.

In the heat exchanger 30 is circulated water which is introduced therein through a tube 32 and discharged therefrom through a tube 33.

The active carbon particles leaving the desorption zone C move into the cooling zone D therebeneath, wherein they are cooled to 100° C. by water introduced therein from a water supply source, not shown, through a tube 9 and jetted through an ejection tube 10 having a plurality of nozzles therein. The aqueous vapor generated is separated from the active carbon particles and extracted through an outlet tube 12 connected to the upper portion of said zone, by introducing with pressure an inert gas into the cooling zone from the lower portion thereof by a pump 13 through a tube 11. The aqueous vapor thus extracted from the cooling zone D is condensed while passing through a heat exchanging tube 35 in the separation tower 34 and then introduced into a separator 36 wherein the inert gas is separated from water. Thereafter, the inert gas is recirculated into the tube 11, whereas the water is discharged to the outside through a tube 37 by a pump 38. The inert gas is arranged to be supplied from the washing tower 19 through a tube 39 and a pump 40. Numerals 41, 42 and 43 designate a valve respectively.

By employing the desulfurizing plant described and illustrated herein, the sulfurous anhydride content in waste gases being released into the atmosphere can be reduced to 100 p.p.m.

A description will now be given on the amount of the cooling water used for cooling the active carbon particles. Industrial waste gases are generally wet to some extent and, when waste gases to be passed through the adsorption zone contain from 10 to 20% water, the amount of cooling water to be sprayed for cooling the active carbon particles in the cooling zone may be determined, in accordance with the amount of active carbon particles to be cooled, so that the active carbon particles leaving the cooling zone may contain from 0.25 to 0.4% water. In other words, when the water content in the waste gases is 10%, the optimum water content in the active carbon particles to be used is 0.25% and accordingly 0.12 kg. of water should be supplied to the cooling zone per 1 kg. of active carbon particles.

According to the present invention in which a suitable amount of water is sprayed directly on the active carbon particles for cooling the same, it is possible to enhance the cooling effect and to obtain uniform cooling, in the regeneration and cooling step of the active carbon particles. Furthermore, heat exchange can be effected highly efficiently, due to the fact that the aqueous vapor generated drying cooling is separated from the active carbon particles by forcibly extracting the same either directly or by means of an inert gas. It is also to be noted that, according to the present invention, the cooling surface as required in the case of indirect cooling can be eliminated, so that the active carbon particles are subjected to less resistance during their movement. Still further advantage of the instant invention is that the amount and concentration of the inert gas to be used for desorbing operation can be maintained constant and thereby the desorbing operation can be carried out in an efficient manner, owing to the surge-tanks provided in the heated inert gas supply system.

We claim:

1. A method of desulfurizing sulfur oxide-containing industrial waste gases by the use of active carbon, in which the steps of low temperature adsorption, high temperature adsorption, desorption of the sulfur oxides from said active carbon by means of a heated inert gas and cooling of the regenerated active carbon are carried out concurrently, said method being characterized in that said cooling step is carried out by subjecting the active carbon to be cooled directly to jets of water.

2. A method of desulfurizing industrial waste gases according to claim 1, in which an inert gas is supplied to forcibly separate the gas generated during the cooling step from the active carbon and extract the same.

3. An apparatus for the desulfurization of industrial waste gases by adsorbing the sulfur oxides contained in said waste gases by active carbon, including a desulfurizing tower having the interior thereof sectioned from the top to bottom into a low temperature adsorption zone, a high temperature adsorption zone, a high temperature desorption zone wherein the sulfur oxides are desorbed by a heated inert gas and a cooling zone, and packed with numerous active carbon particles which are movable therein and may be supplemented as required, and elevator means for transporting the active carbon particles from the cooling zone at the bottom of said desulfurizing tower to the low temperature adsorption zone at the top of the same, said apparatus being characterized by a water inlet port connected to a source of water and provided at the upper portion of said cooling zone to jet water therefrom and a gas extracting port provided above said water inlet port.

4. An apparatus for the desulfurization of industrial waste gases according to claim 3, in which means for recirculating the heated inert gas to be used for the desorbing operation is provided, said means including a heat exchanger, a fan blower, a rinsing device for the regeneration of the inert gas and a surge-tank.

5. An apparatus for the desulfurization of industrial waste gases according to claim 3, in which an inert gas supply port is provided at the lower portion of the cooling zone.

6. An apparatus for the desulfurization of industrial waste gases according to claim 5, in which means for forcibly recirculating the inert gas is provided, said means including a device for condensing the extracted gas.

References Cited
UNITED STATES PATENTS

| | | | |
|---|---|---|---|
| 2,470,339 | 5/1949 | Claussen et al. | 55—61 |
| 2,992,065 | 7/1961 | Feustel et al. | 55—79 |
| 2,992,895 | 7/1961 | Feustel et al. | 23—178 |
| 3,284,158 | 11/1966 | Johswich | 23—178 |

REUBEN FRIEDMAN, *Primary Examiner.*

C. N. HART, *Assistant Examiner.*